(12) United States Patent
Hanna et al.

(10) Patent No.: US 7,784,195 B1
(45) Date of Patent: Aug. 31, 2010

(54) METHOD OF DISPLAYING CONTOURS OF A SURFACE OF A BEARING

(75) Inventors: Ihab M. Hanna, Lake Orion, MI (US); Daniel L. O'Neil, Vassar, MI (US); Jason J. Wiedyk, Grand Blanc, MI (US); Aleksandar J. Filipovic, West Bloomfield, MI (US); Shane E. Bremer, Hope, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 37 days.

(21) Appl. No.: 12/390,140

(22) Filed: Feb. 20, 2009

(51) Int. Cl.
*G01B 5/20* (2006.01)
(52) U.S. Cl. .......................... 33/554; 33/551
(58) Field of Classification Search ........... 33/551–556, 33/503
See application file for complete search history.

(56) References Cited

U.S. PATENT DOCUMENTS

| 4,651,438 | A | 3/1987 | Hutter et al. | |
|---|---|---|---|---|
| 6,260,000 | B1 * | 7/2001 | Karasaki et al. | 33/554 |
| 6,427,354 | B1 * | 8/2002 | Vepsalainen | 33/554 |
| 6,629,374 | B2 * | 10/2003 | Melzer et al. | 33/555 |
| 6,901,677 | B2 * | 6/2005 | Smith et al. | 33/551 |
| 7,003,894 | B2 * | 2/2006 | Schajer et al. | 33/552 |
| 7,047,657 | B2 * | 5/2006 | Goeggelmann et al. | 33/552 |
| 7,100,429 | B2 * | 9/2006 | Matsuki et al. | 33/554 |
| 7,346,999 | B2 * | 3/2008 | Ingram et al. | 33/554 |
| 7,353,616 | B2 * | 4/2008 | Matsumoto et al. | 33/554 |
| RE41,057 | E * | 12/2009 | Smith et al. | 33/551 |
| 2002/0083609 | A1 * | 7/2002 | Melzer et al. | 33/555 |
| 2002/0124427 | A1 * | 9/2002 | Nishimura et al. | 33/554 |
| 2004/0088874 | A1 * | 5/2004 | Sohn et al. | 33/554 |
| 2004/0221465 | A1 * | 11/2004 | Smith et al. | 33/551 |
| 2008/0184579 | A1 * | 8/2008 | McFarland | 33/551 |

* cited by examiner

*Primary Examiner*—Yaritza Guadalupe-McCall
(74) *Attorney, Agent, or Firm*—Quinn Law Group, PLLC

(57) ABSTRACT

Contours of a surface of a bearing which extends about an axis are displayed on a grid. To visualize the contours, points on the surface are measured at a plurality of angular positions to determine the corresponding measured values. The measured values at each angular position are normalized to determine a normalized measurement datum corresponding to each angular position. The normalized measurement datum is subtracted from each of the measured values to determine a plurality of deviations of the corresponding points. Shades are assigned that correspond to a range of possible deviations. Each of the deviations are displayed as a data segment on a grid that represents the shape of the surface of the bearing. Each data segment is shaded on the grid to the corresponding shade to provide a topographical representation of the contours of the surface of the bearing.

19 Claims, 4 Drawing Sheets

METHOD OF DISPLAYING CONTOURS OF A SURFACE OF A BEARING

TECHNICAL FIELD

The present invention relates to a method of displaying contours of a surface of a bearing.

BACKGROUND OF THE INVENTION

Current typical gauging methods for a cam or bearing profile use a single gauging pass around a periphery of a surface of the cam or bearing surface. In order to characterize the level of 'crown' or 'taper' on a cam lobe, for example, often three passes have been used, one around a center of a lobe, followed by one pass near each edge of the lobe. Historically, in order to compute crown or taper, averages of radial deviations from the ideal size/profile about the circumference have been computed for each of these three passes, yielding a single deviation value for each of the three passes. Differences between these three values are typically used to compute a pair of single numbers. One of the numbers from the pair characterizes the crown and the other number characterizes the taper for the entire surface.

This averaging method, however, does not allow for the possibility of severe local surface irregularities that effectively cancel each other out in the traditional crown and taper computations. Furthermore, no meaningful insight is given into actual surface shape of the cam or bearing which might be used to refine the manufacturing process or correlate to bearing performance or durability data.

SUMMARY OF THE INVENTION

The contours of a surface of a bearing that is rotatable about an axis are displayed on a grid. To display the contours, each of a plurality of points on the surface are measured at a plurality of angular positions about the axis to determine a plurality of measured values. The plurality of measured values are normalized at each of a plurality of angular positions about the axis to determine a normalized measurement datum at each of the plurality of angular positions. The normalized measurement datum is subtracted from each of the plurality of measured values to determine a plurality of deviations that correspond to each of the plurality of points. A different shade is assigned to each of a range of possible deviations. Each of the deviations are displayed as a data segment on the grid that represents the shape of the surface of the bearing. Each data segment is shaded on the grid to the shade that corresponds to the value of each of the plurality of deviations. Shading each data segment provides a topographical representation of the contours of the surface of the bearing.

The contours of a surface of each of a plurality of bearings of a camshaft, rotatable about an axis, are displayed on a grid. To display the contours, each of a plurality of points on the surfaces of each of a plurality of bearings are measured at a plurality of angular positions about the axis to determine a plurality of measured values for each of the plurality of bearings. The plurality of measured values for each of the plurality of bearings are normalized at each of the plurality of angular positions about the axis. Normalizing the measured values determines a normalized measurement datum at each of the plurality of angular positions corresponding to each of the plurality of bearings. The normalized measurement datum is subtracted from each of the plurality of measured values for each of the plurality of bearings to determine a plurality of deviations that correspond to each of the plurality of points for each of the plurality of bearings. A different shade is assigned to each of a range of possible deviations. Each of the plurality of deviations are displayed as a data segment on the grid that represents the shape of the surface of the bearing for each of the plurality of bearings. Each data segment is shaded on the grid for each of the plurality of bearings to the shade that corresponds to the value of each of the plurality of deviations to provide a topographical representation of the contours of the surface of the bearing.

The contours of a surface of a bearing that is rotatable about an axis are displayed on a grid. To display the contours, the surface is traced with at least one follower to contact a plurality of points. Each of the points on the surface are measured at a plurality of angular positions about the axis to determine a plurality of measured values. The plurality of measured values are normalized at each of a plurality of angular positions about the axis to determine a normalized measurement datum at each of the plurality of angular positions. The normalized measurement datum is subtracted from each of the plurality of measured values to determine a plurality of deviations that correspond to each of the plurality of points. A different shade is assigned to each of a range of possible deviations. Each of the deviations are displayed as a data segment on the grid that represents the shape of the surface of the bearing. Each data segment is shaded on the grid to the shade that corresponds to the value of each of the plurality of deviations. Shading each data segment provides a topographical representation of the contours of the surface of the bearing.

By providing a topographical representation of the surface of the bearing at each of the plurality of angular positions about the axis, an understanding of crown and localized taper characteristics on the surface of the bearing can be displayed. Displaying the crown and localized taper characteristics may allow the manufacturing process of the surface of the bearing to be refined. In addition, the display of the crown and localized taper characteristics may correlate to bearing performance or durability data.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
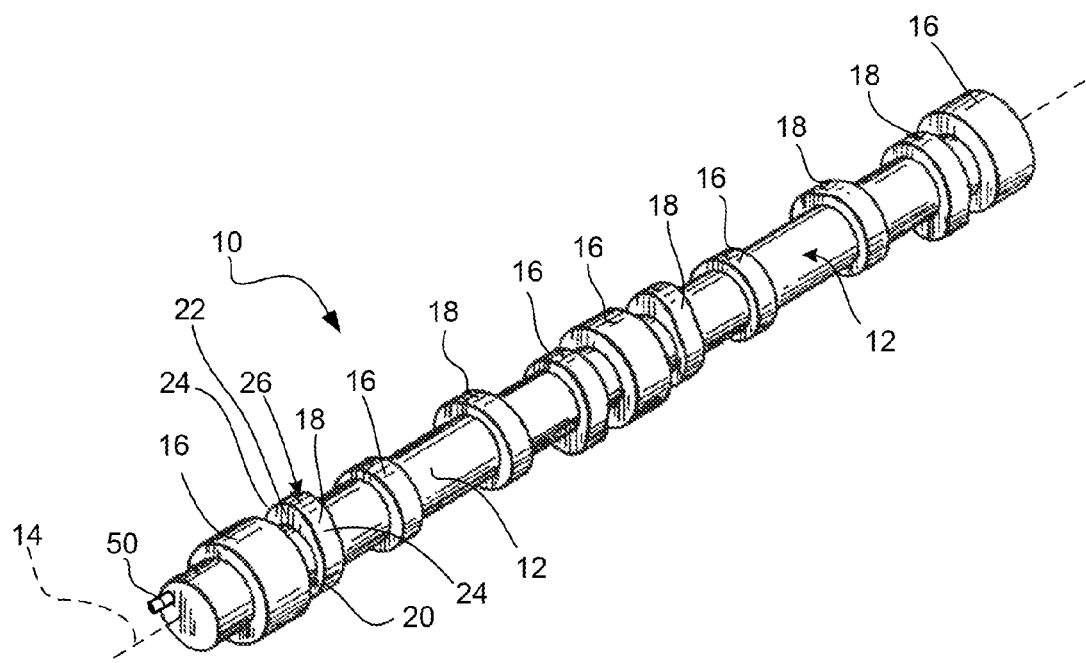
FIG. 1 is a schematic perspective view of a cam shaft having a plurality of bearings extending along a shaft.

Referring to the drawings, wherein like reference numbers refer to like components, FIG. 1 shows a camshaft 10 for use in an engine (not shown) of a vehicle (not shown). The camshaft 10 includes a rod 12 that extends along, and is rotatable about, an axis 14. A plurality of bearings 16 are disposed in spaced relationship along the rod 12. The bearings 16 are circular in shape. The bearings 16 may also be a bearing 16 that is a cam 18 or any other component configured to support loads during rotation. The cams 18 have a base circle 20 with a lobe 22. The lobe 22 includes a pair of ramps 24 that extend from opposing sides of the base circle 20 to a nose 26. Each type of bearing 16, 18 presents a surface 28 that extends about the axis 14. When the bearings 16, 18 are manufactured or formed, contours in the axial direction ω may result on the surface 28 at one or more angular positions 30 about the axis 14 in a circumferential direction α. These contours in the axial direction ω may be a taper or a crown. The taper is the amount the profile of the cam 18 lobe 22 is tipped or sloped relative to the axis 14. The crown is the amount the profile of the cam 18 is curved in the axial direction ω (i.e., concave or convex). In order to display the contours, if any, that are present on the surface 28 at each of the angular positions 30 for each bearing 16, 18, the surface 28 is measured.

Figure 2:
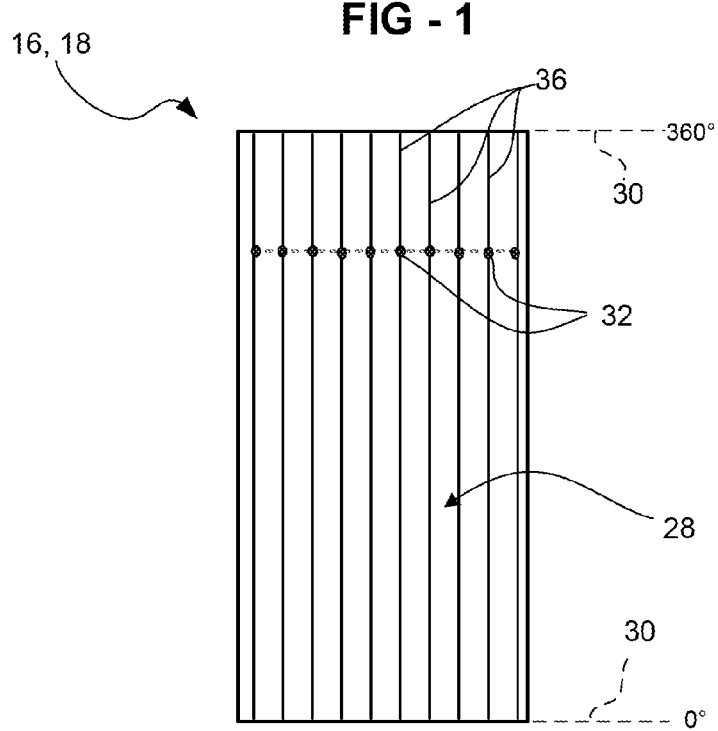
FIG. 2 is a schematic view of a surface of the bearing of the cam shaft, unwrapped from the bearing, illustrating a plurality of traces circumferentially along a surface of the bearing at a plurality of angular positions to provide a plurality of measured values.
Figure 4:
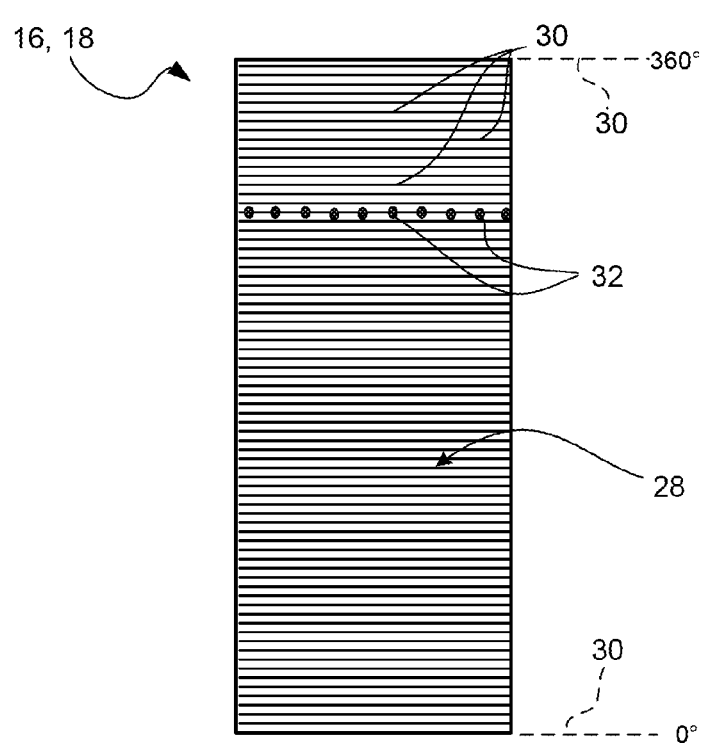
FIG. 4 is a schematic view of the unwrapped surface of the bearing of the cam shaft illustrating a plurality of traces taken axially along the surface of the bearing at a plurality of angular positions to provide a plurality of measured values.

Referring to FIG. 2, a plurality of points 32 are measured on the surface 28 of the bearing 16, 18 at a plurality of the angular positions 30 in the circumferential direction a about the axis 14 to determine a plurality of measured values. Each of the measured values may be in the form of a radius, a lift, a lift error, or other similar quantities known to those skilled in the art. The angular positions 30 are any desired number of spaced angular locations about the axis 14 from between 0° and 360°. For example, the angular positions 30 may be angularly spaced in 1° increments from between 0° and 360° to provide a total of 360 angular positions 30 on the surface 28 of each bearing 16, 18. It should be appreciated that more or less angular positions may be used as known to those skilled in the art. At each angular position 30 about the axis, a plurality of spaced measured values are taken in the axial direction ω, i.e., in the direction of the axis 14 of the bearing 16, 18 on the camshaft 10. For example, a total of ten spaced points 32 are taken at each angular position 30, as illustrated in FIGS. 2 and 4, with a total of 360 angular positions to provide a total of 3600 measured values on the surface 28 of the bearing 16, 18. However, more or less points 32 may be measured at each angular position 30 as known to those skilled in the art. The points 32 may be measured using a gauge (not shown), i.e., a cylindrical coordinate measuring machine, and the like. The gauge measures the points 32 by tracing along the surface 28 of the bearing 16, 18 with one or more followers. Tracing along the surface 28 with the follower means that the follower follows the contours of the surface 28 of the bearing 16, 18 to obtain the measured values at each of the plurality of points 32 during the tracing. The measured values relate to the deviation δ, i.e., the contours, of the surface 28. The tracing by the follower may be circumferentially in the angular direction α, at a plurality of axial positions 36, as shown in FIG. 2, or in the axial direction ω, at a plurality of angular positions 30, as shown in FIG. 4. It should be appreciated, however, that the method of determining the measured values at each of the plurality of data points 32 is not limited as described herein, as other methods known to those skilled in the art may also be used.

The measured values at each angular position 30 are normalized to determine a normalized measurement datum that corresponds to each angular position 30. The measured values may be normalized by averaging the measured values at each angular position 30. It should be appreciated, however, that normalizing the measured values is not limited to averaging, as any other method of normalizing known to those skilled in the art may also be used. Referring to FIG. 2, ten measured values are averaged at each of the 360 angular positions 30 to provide a total of 360 normalized measurement data 40. The normalized measurement datum is subtracted from each of the measured values corresponding to the respective angular position 30 to determine a plurality of deviations φ equal to the number of normalized measurement data on the surface 28 of the bearing 16, 18. With respect to the cams 18, normalizing the data filters out the radial shape of the lobes 22 to provide measured values that are synonymous with a round bearing 16.

A different shade 44 is assigned to each of a range of possible deviations φ. In the embodiments shown in FIGS. 3 and 5-7, the deviations φ range from between +4 micrometers (μm) and −4 μm. The invention is not limited to deviations φ in this range as other ranges of deviations φ may also be used as known to those skilled in the art. While the shades 44 are depicted in the present application as a grayscale, it should be appreciated that any shade 44 of colors may preferably be used as known to those skilled in the art. For example, the shading may range from dark red for all deviations φ greater than +4 and dark blue for all deviations φ less than −4 μm. The shades 44 between +4 μm and −4 μm may then be graduated to coincide with a color scale that changes from between red, orange, yellow, green, blue, indigo, and violet. However, other color scale graduations, such as grey scale and the like, may also be used as known to those skilled in the art. In addition, for deviations φ that are greater than +4 μm, a single shade 44 may be assigned. Likewise, for deviations φ that are less than −4 μm, an additional single shade 44 may be assigned.

Each deviation φ is displayed as a data segment 46 on a grid 48 that represents the shape of the surface 28 of the bearing 16, 18. Each data segment 46 is then shaded on the grid 48 to the shade 44 that corresponds to or represents the value of each of the plurality of deviations φ, as shown in FIGS. 3, and 5-7. Therefore, each shaded data segment 46 on the grid 48 shows a comparison to the normalized value, e.g., the average value, of the corresponding angular position 30. The shading of the data segments 46 provides a topographical representation of the contours of the surface 28 of the bearing 16, 18.

To further improve the display of the data segments 46 on the grid 48, a smoothing algorithm may be applied to the normalized measurement datum of the normalized data at each of the angular positions 30. Application of the smoothing algorithm results in a smoothed normalized measurement datum at each angular position 30. Application of the smoothing algorithm to the normalized measurement datum may provide a total of 360 normalized measurement datum for each bearing 16, 18. When the smoothing algorithm is applied, the normalized measurement datum is subtracted from each of the plurality of measured values to determine a corresponding number of deviations φ. The smoothing algorithm may be a moving average smoothing algorithm. However, other smoothing algorithms known to those skilled in the art may also be used.

Referring again to FIG. 1, in order to establish a reference point 32 for the surface 28 of the bearing 16, 18, a datum point 50 may be referenced prior to measuring the plurality of data points 32 on the surface 28 of the bearing 16, 18. If more than one bearing 16, 18 is being measured at the same time, the datum point 50 may either be referenced prior to measuring each bearing 16, 18 or only once prior to measuring all of the bearings 16, 18 in their entirety.

Figure 3:
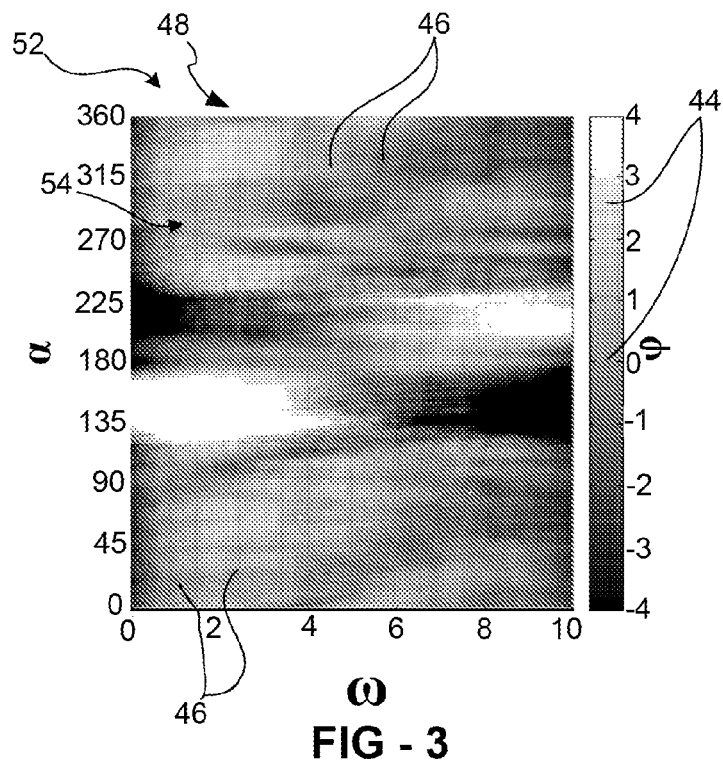
FIG. 3 is a topographical representation of the unwrapped surface of the bearing of FIG. 2 showing the contours of the surface presented as a two-dimensional surface.
Figure 5:
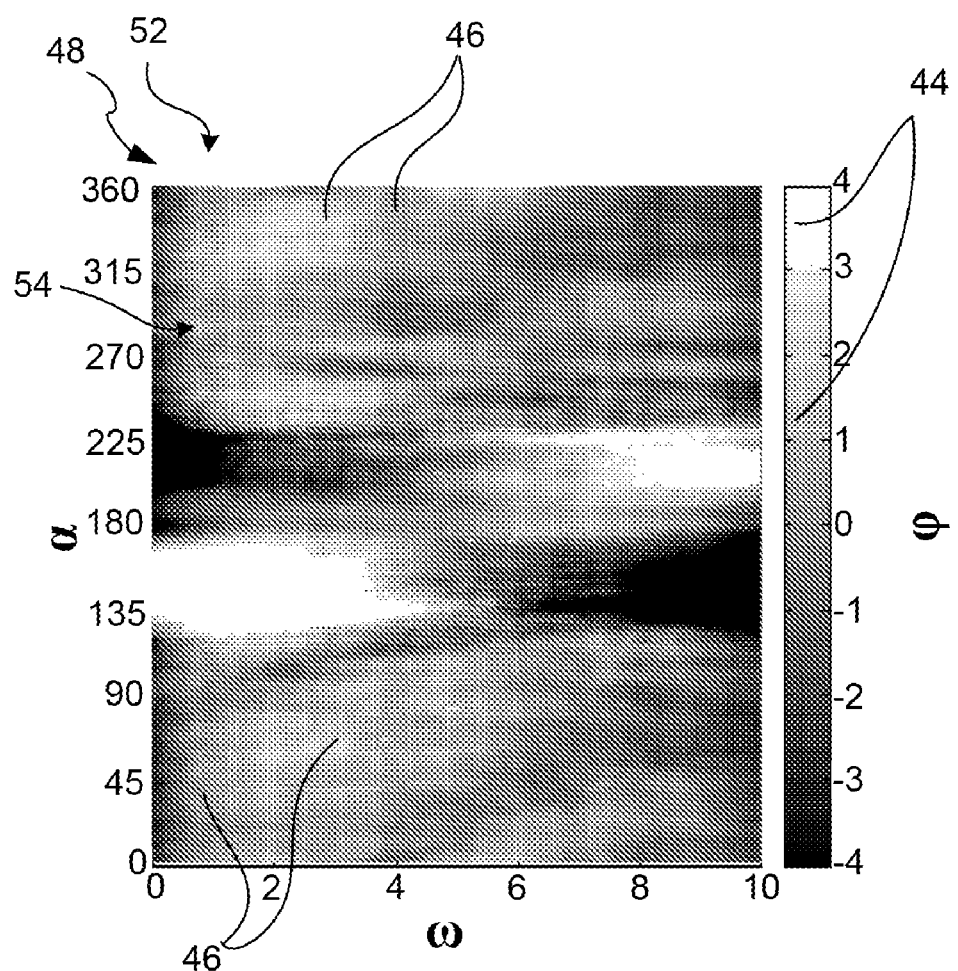
FIG. 5 is a topographical representation of the unwrapped surface of the bearing of FIG. 4 showing the contours of the surface presented as a two-dimensional surface.
Figure 6:
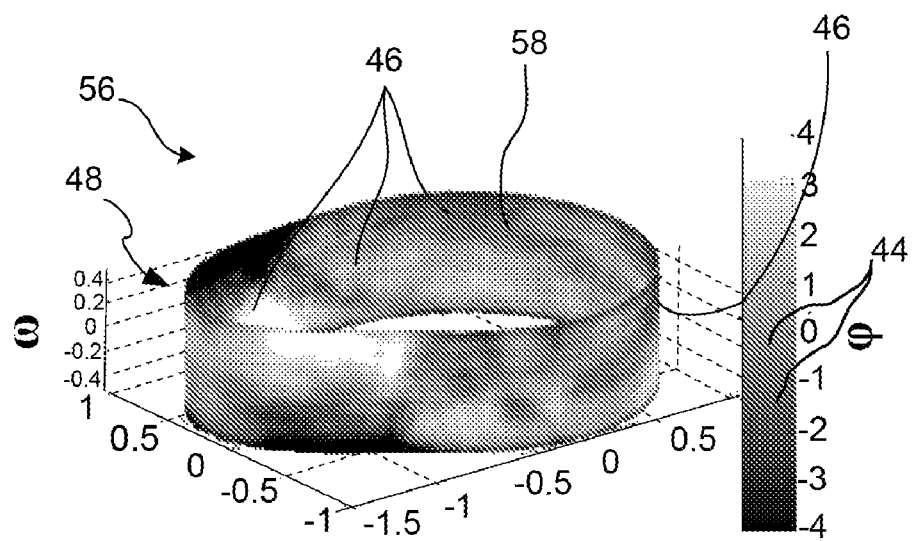
FIG. 6 is another embodiment of the topographical representation of the surface of the bearing presented as a three-dimensional surface.
Figure 7:
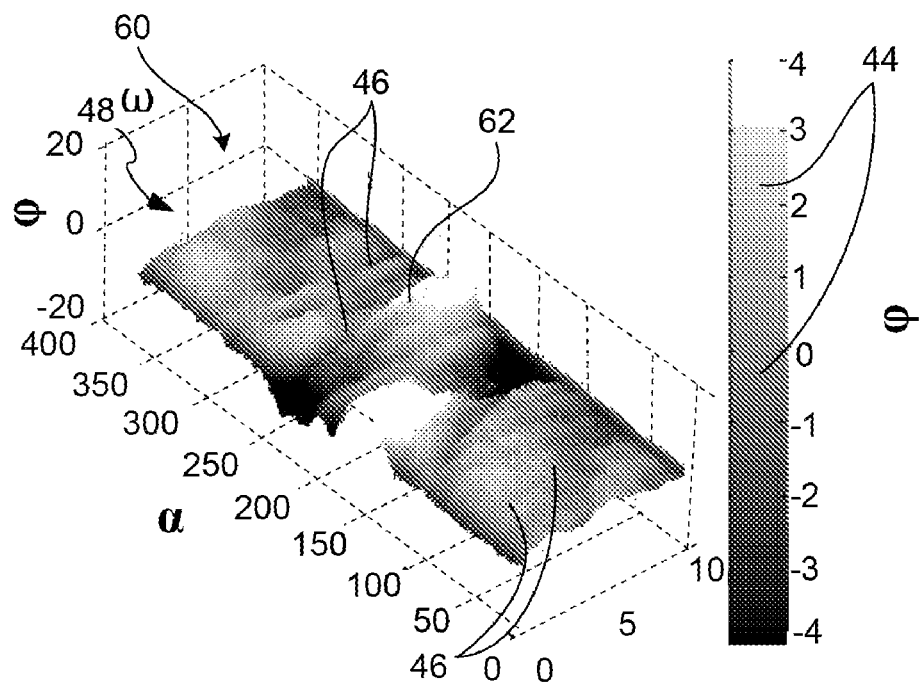
FIG. 7 is yet another embodiment of the topographical representation of the unwrapped surface of the bearing presented as a perspective view of a two-dimensional, undulated surface.

Each of the deviations φ may be displayed as a data segment 46 on a grid 48 that represents the three dimensional shape of the surface 28 of the bearing 16, 18. As shown in FIGS. 3 and 5, the representation may be a two-dimensional rectangular grid 52, where the grid 48 represents the surface 28 of the bearing 16, 18 unwrapped from the bearing 16, 18 in a two-dimensional rectangular shape 54. Alternatively, as shown in FIG. 6, the representation may be a three-dimensional representation 56 on a grid 48 of the three-dimensional shape 58 of the bearing 16, 18. For example, referring again to FIG. 6, if the bearing 16, 18 is a cam 18, the cam 18 would be represented on the grid 48 as a three-dimensional shape having the base circle 20, the pair of ramps 24, and the nose 26 extending between the ramps 24. Additionally, once the three-dimensional shape of the bearing 16, 18 is represented on the graph as the tree-dimensional representation, the user may rotate or change the size of the three dimensional shape on the graph to view a desired area of the surface 28. As shown in FIG. 7, the representation may also be a perspective two-dimensional topographical representation 60 on the grid 48 of the unwrapped surface of bearing 16, 18 showing the deviations δ of the surface 28 of the bearing 16, 18.

While the best modes for carrying out the invention have been described in detail, those familiar with the art to which this invention relates will recognize various alternative designs and embodiments for practicing the invention within the scope of the appended claims.

The invention claimed is:

1. A method of displaying contours of a surface of a bearing rotatable about an axis, the method comprising the steps of:
    measuring each of a plurality of points on the surface of the bearing at a plurality of angular positions about the axis to determine a plurality of measured values;
    normalizing the plurality of measured values at each of a plurality of angular positions about the axis to determine a normalized measurement datum at each of the plurality of angular positions;
    subtracting the normalized measurement datum from each of the plurality of measured values to determine a plurality of deviations corresponding to each of the plurality of points;
    assigning a different shade to each of a range of possible deviations;
    displaying each of the plurality of deviations as a data segment on a grid representing the shape of the surface of the bearing; and
    displaying each data segment on the grid as a shade that corresponds to the value of each of the plurality of deviations to provide a topographical representation of the contours of the surface of the bearing.

2. A method of displaying contours of a surface, as set forth in claim 1, further including applying a smoothing algorithm to the normalized measurement datum of the normalized data at each of the plurality of angular positions to determine a smoothed normalized measurement datum, and wherein subtracting the normalized measurement datum is further defined as subtracting the smoothed normalized measurement datum from each of the plurality of measured values to determine a deviation corresponding to each of the plurality of points.

3. A method of displaying contours of a surface, as set forth in claim 2, wherein applying a smoothing algorithm is further defined as applying a moving average smoothing algorithm to the normalized measurement datum of the normalized data at each of the plurality of angular positions to determine a smoothed normalized measurement datum.

4. A method of displaying contours of a surface, as set forth in claim 1 wherein normalizing the plurality of corresponding values is further defined as averaging the plurality of corresponding values at each of the plurality of angular positions to determine a normalized measurement datum at each of the plurality of angular positions.

5. A method of displaying contours of a surface, as set forth in claim 1 further comprising referencing a datum point to establish a base reference point only once prior to measuring the plurality of data points on the surface of the bearing.

6. A method of displaying contours of a surface, as set forth in claim 1, wherein displaying is further defined as displaying each of the plurality of deviations as a data segment on a grid representing the three dimensional shape of the bearing.

7. A method of displaying contours of a surface, as set forth in claim 1, wherein displaying is further defined as displaying each of the plurality of deviations as a data segment on a grid as a two dimensional shape illustrating the surface of the bearing unwrapped from the bearing.

8. A method of displaying contours of a surface, as set forth in claim 1, wherein displaying is further defined as displaying each of the deviations as a data segment on a grid as a three dimensional shape illustrating the surface of the bearing unwrapped from the bearing.

9. A method of displaying contours of a surface, as set forth in claim 1, wherein assigning a shade is further defined as assigning a shade corresponding to a range of deviations of between +4 micrometers and −4 micrometers.

10. A method of visualizing contours of a surface of each of a plurality of bearings extending about an axis on a camshaft, the method comprising the steps of:
    measuring each of a plurality of points on the surfaces of each of a plurality of bearings at a plurality of angular positions about the axis to determine a plurality of measured values for each of the plurality of bearings;
    normalizing the plurality of measured values for each of the plurality of bearings at each of a plurality of angular positions about the axis to determine a normalized measurement datum at each of the plurality of angular positions corresponding to each of the plurality of bearings;
    subtracting the normalized measurement datum from each of the plurality of measured values for each of the plurality of bearings to determine a plurality of deviations corresponding to each of the plurality of points for each of the plurality of bearings;
    assigning a different shade to each of a range of possible deviations;
    displaying each of the plurality of deviations as a data segment on a grid representing the shape of the surface of the bearing for each of the plurality of bearings; and
    displaying each data segment on the grid for each of the plurality of bearings as a shade that corresponds to the value of each of the plurality of deviations to provide a topographical representation of the contours of the surface of the bearing.

11. A method of displaying contours of a surface, as set forth in claim 10, further comprising referencing a datum point only once to establish a base reference point prior to measuring the plurality of data points on the surface of each of the plurality of bearings.

12. A method of displaying contours of a surface, as set forth in claim 10, further comprising referencing a datum point only once to establish a base reference point prior to measuring the plurality of data points on the surface of each of the plurality of bearings.

13. A method of displaying contours of a surface, as set forth in claim 10, further including applying a smoothing algorithm to the normalized measurement datum of the normalized data at each of the plurality of angular positions for each of the plurality of bearings to determine a smoothed normalized measurement datum for each of the plurality of bearings, and wherein subtracting the normalized measurement datum is further defined as subtracting the smoothed normalized measurement datum from each of the plurality of measured values of each of the plurality of bearings for each of the plurality of bearings to determine a deviation corresponding to each of the plurality of points of each of the plurality of bearings.

14. A method of displaying contours of a surface, as set forth in claim 13, wherein applying a smoothing algorithm is further defined as applying a moving average smoothing algorithm to the normalized measurement datum of the normalized data at each of the plurality of angular positions of each of the plurality of bearings to determine a smoothed normalized measurement datum at each of the plurality of angular positions for each of the plurality of bearings.

15. A method of displaying contours of a surface, as set forth in claim 10 wherein normalizing the plurality of corresponding values is further defined as averaging the plurality of corresponding values at each of the plurality of angular positions of each of the plurality of bearings to determine a normalized measurement datum at each of the plurality of angular positions of each of the plurality of bearings.

16. A method of displaying contours of a surface, as set forth in claim 10, wherein displaying is further defined as displaying each of the plurality of deviations as a data segment on a grid representing the three dimensional shape of each of the plurality bearings.

17. A method of displaying contours of a surface, as set forth in claim 10, wherein displaying is further defined as displaying each of the plurality of deviations as a data segment on a grid as a two dimensional shape illustrating each of the surfaces unwrapped from each of the plurality of bearings.

18. A method of displaying contours of a surface, as set forth in claim 10, wherein displaying is further defined as displaying each of the deviations as a data segment on a grid as a three dimensional shape illustrating each of the surfaces unwrapped from each of the plurality of bearings.

19. A method of displaying contours of a surface of a bearing extending about an axis, the method comprising the steps of:

tracing along the surface of the bearing with at least one follower to contact a plurality of points on the surface;

measuring each of the plurality of points on the surface of the bearing at a plurality of angular positions about the axis to determine a plurality of measured values;

averaging the plurality of measured values at each of a plurality of angular positions about the axis to determine a normalized measurement datum at each of the plurality of angular positions;

subtracting the normalized measurement datum from each of the plurality of measured values to determine a plurality of deviations corresponding to each of the plurality of points;

assigning a different shade to each of a range of possible deviations;

displaying each of the plurality of deviations as a data segment on a grid representing the shape of the surface of the bearing; and displaying each data segment on the grid as a shade that corresponds to the value of each of the plurality of deviations to provide a topographical representation of the contours of the surface of the bearing.

* * * * *